United States Patent [19]

Kurata

[11] Patent Number: 4,901,291
[45] Date of Patent: Feb. 13, 1990

[54] WRIST WATCH TYPE RECEIVER OF FISH SONAR

[75] Inventor: Hisao Kurata, Aichi, Japan

[73] Assignee: Honda Electric Co., Ltd., Tokyo, Japan

[21] Appl. No.: 157,405

[22] Filed: Feb. 17, 1988

[30] Foreign Application Priority Data

May 13, 1987 [JP] Japan .............................. 62-71299[U]

[51] Int. Cl.⁴ ............................................. G01S 15/06
[52] U.S. Cl. ..................................... 367/111; 367/910; 368/14
[58] Field of Search ..................... 367/910, 111, 108; 181/124; 73/290 V, 766; 340/621; 358/241; 368/10, 14

[56] References Cited

U.S. PATENT DOCUMENTS

| | | | |
|---|---|---|---|
| 4,079,413 | 3/1978 | Yamashita | 358/241 X |
| 4,409,827 | 10/1983 | Overs | 367/108 X |
| 4,651,309 | 3/1987 | Honda | 367/115 X |
| 4,668,100 | 5/1987 | Murakami et al. | 368/14 X |
| 4,694,694 | 9/1987 | Vlakancic et al. | 368/14 X |
| 4,757,481 | 7/1988 | Orr et al. | 367/96 |
| 4,809,242 | 2/1989 | Oka et al. | 367/113 |

FOREIGN PATENT DOCUMENTS

| | | | |
|---|---|---|---|
| 0159083 | 9/1984 | Japan | 368/10 |
| 1540732 | 2/1979 | United Kingdom | 368/10 |

*Primary Examiner*—Thomas H. Tarcza
*Assistant Examiner*—Tod Swann
*Attorney, Agent, or Firm*—Burgess, Ryan and Wayne

[57] ABSTRACT

Fish sonar signals, temperature signals, PH signals or speed signals of a boat which are emitted from a transmitter as RF signals are respectively received in a wrist watch type receiver, and are displayed on a display device attached to a case of the wrist watch type receiver, whereby each fisherman can see the state of the sea by putting on the wrist watch type receiver to his wrist.

4 Claims, 4 Drawing Sheets

1

WRIST WATCH TYPE RECEIVER OF FISH SONAR

BACKGROUND OF THE INVENTION

The present invention relates to a wrist watch type receiver of fish sonar for being able to see the state of the sea.

Generally, telecommunication apparatus is known in which very high frequency signals from a transmitter attached to a buoy of a stationary fish net in the sea are received by a receiver at a remote seashore, the transmitter having an ultrasonic transmitting-receiving vibrator and an echo signal transmitting portion.

However, in this telecommunication apparatus, the state of the sea, of a near portion of a fishing boat or a quay is not seen at hand.

When many fishermen fish using a fishing boat having a fish sonar, even if some fishermen near the display device of the fish sonar can see the state of the sea, the other fisher men cannot see the state of the sea.

SUMMARY OF THE INVENTION

It is, therefore, the primary object of the present invention to provide a wrist watch type receiver wherein the fisherman is able to have a display device.

It is another object of the present invention to provide a wrist watch type receiver for receiving radio frequency (RF) signals from a transmitter by a case or a metal band.

In order to accomplish the above and other objects, the present invention provides a band put on to a wrist, a case attached to the band, a transmitter attached in the case, a display device attached on the case, an RF signal converting circuit of the transmitter for receiving RF signals through an antenna line, and a display signal processing circuit of the transmitter for converting signals from the RF signal converting circuit to display signals, whereby the display signals are displayed by the display device to display the state of the sea.

DESCRIPTION OF THE PREFERRED EMBODIMENTS

Figure 1:
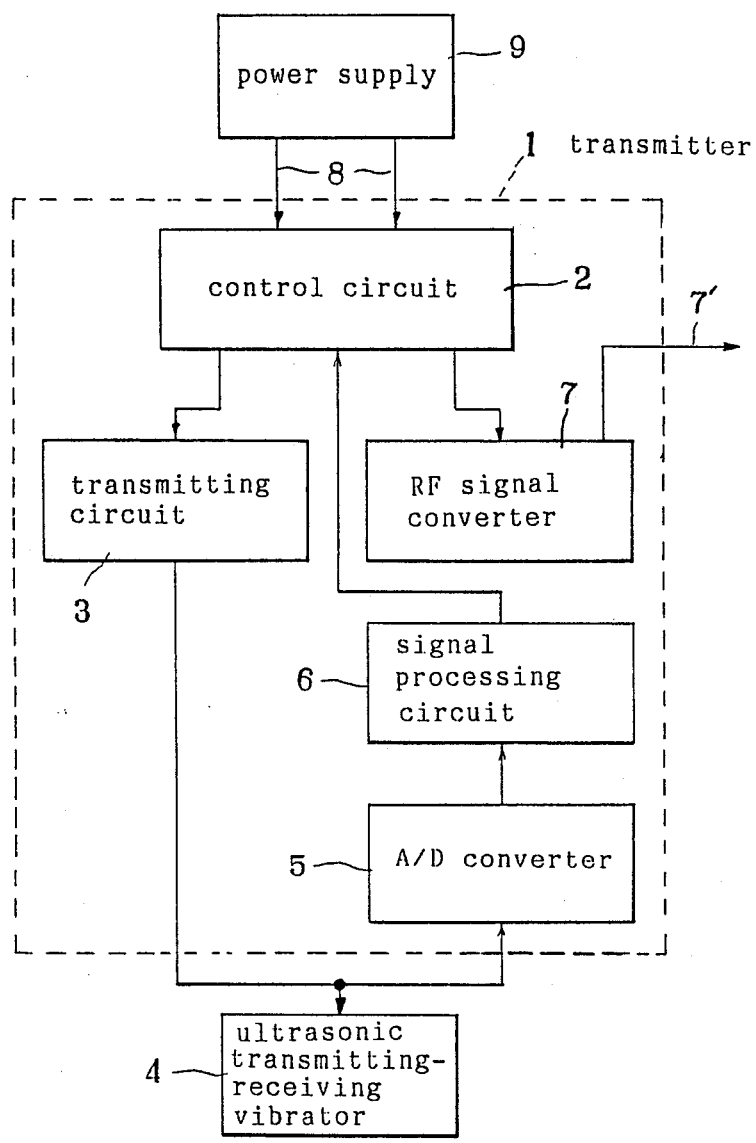
FIG. 1 shows a block diagram of a transmitter for transmitting RF signals in the present invention.

Referring to FIG. 1, in a transmitter 1, a transmitting circuit 3 is connected to the output terminal of a control circuit 2, and an ultrasonic transmitting-receiving vibrator 4 is connected to the output terminal of transmitting circuit 3, and with the input terminal of an A/D converter 5. The output terminal of the A/D converter 5 is connected to a signal processing circuit 6. The output terminal of the signal processing circuit 6 is connected to the control circuit 2 and an RF signal converter 7 is connected to the output terminal of the control circuit 2 and an antenna 7' is connected to the output terminal of the RF signal converter. 7. The control circuit 2 is connected through lines 8 to a power supply 9.

Figure 2:
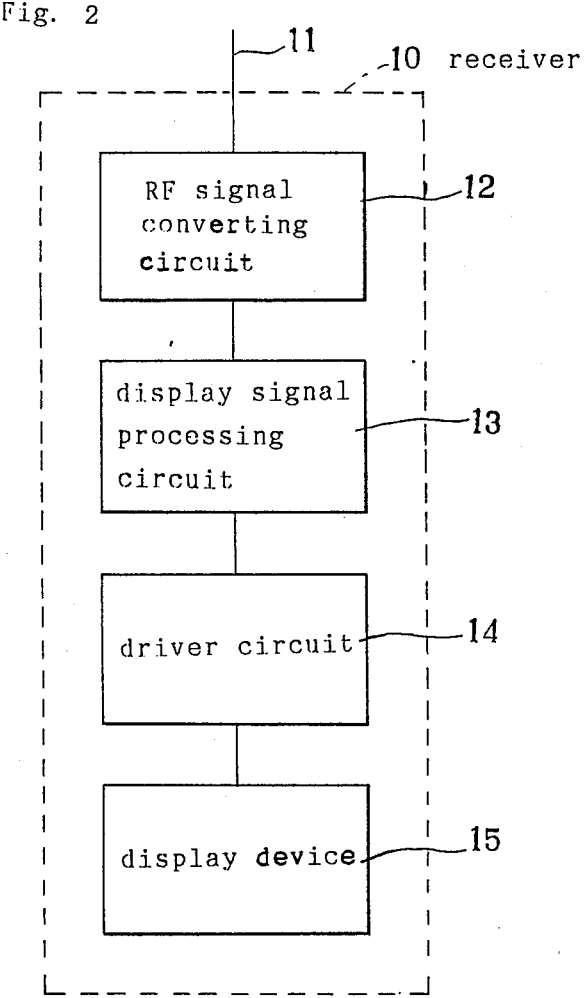
FIG. 2 shows a block diagram of a receiver in the present invention.

Referring to FIG. 2, in a receiver 10, an antenna line 11 is connected to an RF signal converting circuit 12. A display signal processing circuit 13 is connected to the output terminal of the RF signal converting circuit 12. The output terminal of the display signal processing circuit 13 is connected to a driver circuit 14, and a display device 15 comprising a crystal liquid display device and so on is driven by the output of the driver circuit 14.

Figure 3:
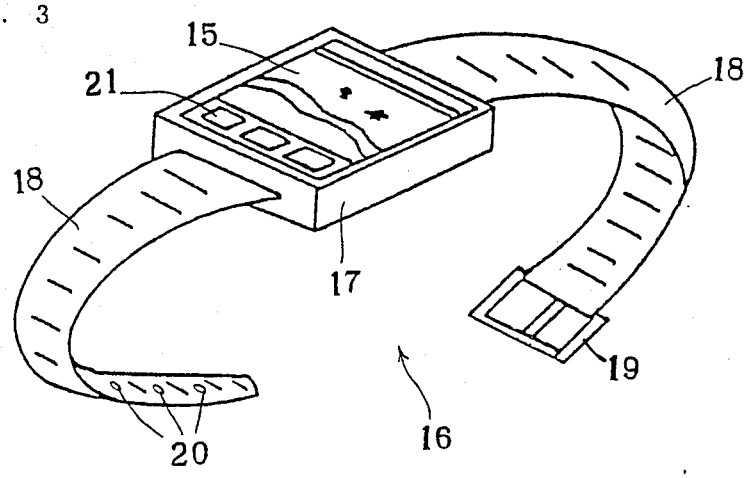
FIG. 3 shows a perspective view of a wrist watch type receiver of the present invention.

Referring to FIG. 3, in a wrist watch type receiver 16, the receiver 10 is assembled in a case 17 and the display device 15 is attached to the surface of the case 17. A band 18 is attached to the case 17 and a clasp 19 is attached to one end of the band 18. The wrist watch type receiver 16 is put onto a wrist by hooking the clasp 19 to a hole 20 of the other end of the band 18. Buttons 21 comprising a power supply switch and a display switch are attached under the display device 15. The antenna line 11 of the receiver 10 is connected to the case 17 or the metal band 18 of the a wrist watch type receiver 16.

In the above embodiment of the present invention, when pulse signals are generated from the transmitting circuit 3 of the transmitter 1, ultrasonic wave signals are emitted in the sea from the ultrasonic transmitting-receiving vibrator 4. The echoes of the ultrasonic waves are received by the ultrasonic transmitting-receiving vibrator 4, and the received signals are converted to digital signals by the A/D converter 5. The digital signals are processed by the signal processing circuit 6, are taken in the control circuit 2, and then are transmitted from the control circuit 2 to the RF signal converter 7. The processed digital signals are converted to the RF signals in the RF signal converter 7 and the RF signals are emitted from the antenna 7'.

The RF signals emitted from the antenna 7' are received by the case 17 or the band 18, are applied through the antenna line 11 to the RF signal converter 12 in the receiver 10 and are converted to electric signals. The electric signals are converted to display signals in the display signal processing circuit 13. The driver circuit 14 is driven by the display signals from the display signal processing circuit 13 and the state of the sea is displyed on the display device 15 as shown in FIG. 3.

As the wrist watch type receiver 16 is put on to each wrist of the fishermen, each fishermen can see the state in the sea which is displayed by the display device 15.

When many fishermen fish taking a large fishing boat and each put on the wrist watch type receiver 16 according to the present invention each fisherman can see the state of the sea which is displayed on the display device 15 in the wrist watch type receiver 16 by receiving the radio wave signals emitted from the transmitter 1.

Figure 4:
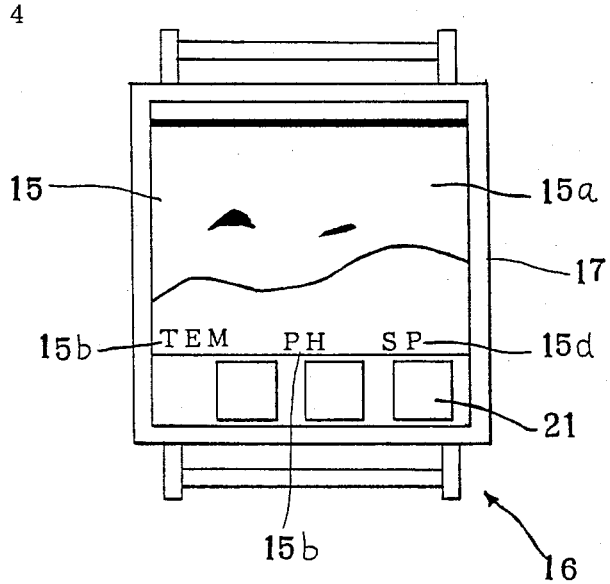
FIG. 4 shows a front view of a wrist watch type receiver of the present invention.

In FIG. 4, the display device 15 attached to the case 17 is provided with a portion 15a for displaying the state of the sea, a portion 15b for displaying the temperature in the sea, a portion 15c for displaying the PH in the sea and a portion 15c for displaying the speed of the fishing boat. The switch buttons 21 comprising a power supply switch or a switch for selectively displaying the state of the sea, the temperature, the PH or the speed are attached under the display device 15.

Figure 5:
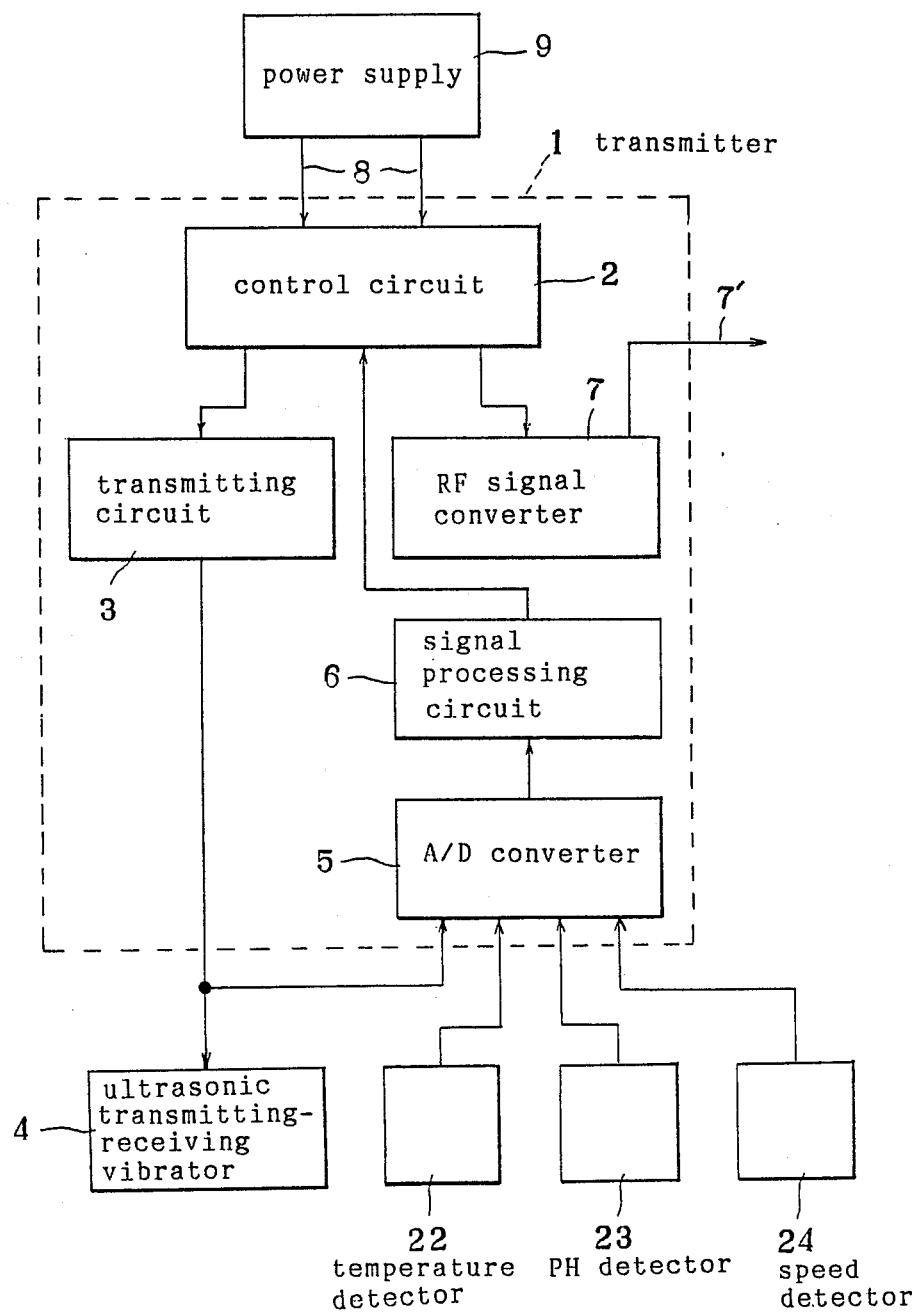
FIG. 5 shows a block diagram of a receiver of another embodiment of the present invention.

In FIG. 5, 1 shows transmitter, 2; a control circuit, 3; a transmitting circuit, 4; an ultrasonic transmitting-receiving vibrator, 5; an A/D converter, 6; a signal processing circuit, 7; an RF signal converter, 8; lines, and 9; a power supply. These constitutions are the same as those in FIG. 1. In the embodiment of FIG. 5, a wrist watch type receiver 16 comprises a temperature detector 22 for detecting the temperature in the sea, a PH detector 23 for detecting the PH in the sea and a speed detector 24 for detecting the speed of a fishing boat. The output terminal of the RF signal converter 7 is connected to the lines 8 used as a antenna line.

In the transmitter 1 as shown in FIG. 5, the temperature signals from the temperature detector, the PH signals from the PH detector and the speed signals from the speed detector are respectively converted to the digital signals in the A/D converter 5 and are supplied to the signal processing circuit 6. The processed signals from the signal processing circuit 6 are taken in the control circuit 2 and are supplied to the RF signal converter 7. The processed signals supplied to the RF signal converter are converted to RF signals and the RF signals are emitted from the line 8.

When the RF signals emitted from the line 8 are received through the case 17 or the band 18 in the wrist watch type receiver 16, the temperature in the sea, the PH in the sea and the speed of the fishing boat are respectively or selectively displayed in the display portions 15b, 15c and 15d by the switch buttons 21.

What is claimed is:

1. A fish sonar apparatus comprising:
    transmitter means comprising:
        transmitting circuit means for transmitting pulse signals,
        transmitting-receiving vibrator means for generating ultrasonic waves and for receiving echo signals,
        signal processing means for processing said received echo signals,
        RF signal converter means for converting the processed signals to RF signals, and
        antenna means for transmitting said RF signals in the air; and
    at least one wrist watch type receiver for displaying a state of water, each comprising:
        a case,
        a band attached to said case for securing the case about a wrist of a user,
        an antenna line connected to said case or the band for receiving RF signals containing information on the state of the water, from the transmitting means,
        RF signal converting means in said case for converting the RF signals to electric signals,
        display signal converting means in said case for converting said electric signals to display signals, and
        display means of a surface of said case for displaying the state of the water in response to the display signals.

2. A fish sonar apparatus according to claim 1, wherein said display means includes display portion means for displaying the temperature of the water.

3. A fish sonar apparatus according to claim 1, wherein said display means includes first display portion means for displaying pH of the water.

4. A fish sonar apparatus according to claim 3, wherein said display means includes second display portion means for displaying speed of a boat carrying said at least one wrist watch type receiver.

* * * * *